United States Patent
Muramoto et al.

(10) Patent No.: US 7,364,645 B2
(45) Date of Patent: Apr. 29, 2008

(54) PROCESS FOR FORMING CURED GRADIENT COATING FILM AND MULTI-LAYERED COATING FILM CONTAINING THE SAME

(75) Inventors: Hisaichi Muramoto, Hyogo-ken (JP); Koji Izumiya, Osaka-fu (JP)

(73) Assignee: Nippon Paint Co., Ltd., Osaka-Fu (JP)

( * ) Notice: Subject to any disclaimer, the term of this patent is extended or adjusted under 35 U.S.C. 154(b) by 902 days.

(21) Appl. No.: 10/702,436

(22) Filed: Nov. 7, 2003

(65) Prior Publication Data

US 2004/0118687 A1 Jun. 24, 2004

(30) Foreign Application Priority Data

Nov. 8, 2002 (JP) .............................. 2002-325629

(51) Int. Cl.
*C25D 13/06* (2006.01)
(52) U.S. Cl. ........................ 204/486; 204/487; 204/504
(58) Field of Classification Search ................ 204/486, 204/487, 504
See application file for complete search history.

(56) References Cited

FOREIGN PATENT DOCUMENTS

JP 08-333528 A * 12/1996

* cited by examiner

*Primary Examiner*—Kishor Mayekar
(74) *Attorney, Agent, or Firm*—Wenderoth, Lind & Ponack, L.L.P.

(57) ABSTRACT

The present invention provides an improved two-layer coating system. The present invention relates to a process for forming a cured gradient coating film, comprising the steps of: applying an aqueous electrodeposition coating composition comprising at least two resins and a curing agent, on an electrically conductive substrate, heating a electrodeposition coating film to form a layer separation, and then, curing the electrodeposition coating film to form a cured gradient coating film; wherein the resins include one resin component constituting a resin layer (a) in direct contact with air before applying top coating and other resin component constituting a resin layer (b) in direct contact with the electrically conductive substrate, and, wherein a solubility parameter ($\delta a$) of a resin component A and a solubility parameter ($\delta b$) of a resin component B have a specific relationship.

7 Claims, No Drawings

PROCESS FOR FORMING CURED GRADIENT COATING FILM AND MULTI-LAYERED COATING FILM CONTAINING THE SAME

FIELD OF THE INVENTION

The present invention relates to a process for forming a cured gradient coating film and a process for forming a multi-layered coating film including the same as one layer, which is useful for paint industry, especially automobile coating. In addition, the present invention also relates to a process for forming a multi-layered coating film with intermediate-coating-less system (two-layer coating system) in which a top coating composition is directly coated on an electrodeposition coating film.

BACKGROUND OF THE INVENTION

Lately, in paint field, especially in the field of automobile coating, decreasing coating step has been strongly required to attain resource saving, cost-saving and decreasing damage to environment (VOC and HAPs, etc.). Specifically, a method for forming a coating film with intermediate-coating-less (two-layer coating system) is desired in which top coating is applied directly on an electrodeposition primer coating. The two-layer coating system reduces number of coating steps compared with three layer coating having an electrodeposition primer coating, an intermediate coating and a top coating. The two-layer coating systems should also have composed of excellent appearance, adhesiveness to top coating, weather resistance and corrosion resistance equal to the conventional three layer coating.

Regarding electrodeposition coating by way of the intermediate-coating-less system, Japanese Patent Kokoku Publication No. 33069/1990 discloses an electrocoating composition which forms two-layered coating with thick film thickness type. The invention is directed to a composition which contains a cationic acrylic resin having a softening point of 80° C. or more and a cationic phenol type epoxy resin having a softening point of 75° C. or less at a weight ratio of 1 to 30:1. It is described that the coating film formed from this composition has a two layer structure composed of an epoxy type underlayer having good corrosion resistance and an acrylic type upper layer having good weather resistance.

Japanese Patent Kokoku Publication No. 99652/1994 demonstrates that a cured multi layered electrodeposition coating film can be formed from an epoxy type cation electrodepositable resin and a non-ionic film-forming resin, which have particular surface tension.

Japanese Patent Kokai Publications Nos. 333528/1996 and 292131/1998 also disclose a cured multi layered coating film which is formed from a composition containing an amine-modified epoxy type cation resin, a (self-crosslinking) acrylic type cationic resin having lower solubility parameter than the former resin, and a block polyisocyanate curing agent.

Japanese Patent Kokai Publication No. 345394/2000 discloses that an electrodeposition coating composition containing two different resins that are incompatible with each other and have solubility parameter difference of not less than 1 is electrically coated to form an electrodeposited coating with complete layer separation which provides with corrosion resistance and weather resistance equal to two-layer coating film.

Japanese Patent Kokai Publication No. 281943/2000 describes an electrodeposition coating composition containing a binder component dispersed in neutralizing agent-containing aqueous solution and a pigment, wherein the binder component contains two acrylic resins having independent solubility parameter.

The aforementioned inventions described in Japanese Patent Kokoku Publications Nos. 33069/1990 and 99652/1994 and Japanese Patent Kokai Publication Nos. 333528/1996 and 292131/1998 merely show a technique of layer (resin) separation in electrodeposition coating. These inventions hardly provide a multi layered coating film having excellent appearance and weather-resistance equal to the conventional three-coat coating film.

The composition described in Japanese Patent Kokoku Publication No. 33069/1990 contains a cationic phenol type epoxy resin having a softening point of 75° C. or less, which however adversely affects on a resulting cured film in solvent resistance and corrosion resistance. On the other hand, in Japanese Patent Kokoku Publication No. 99652/1994, a nonionic film-forming resin used may provide inferior adhesiveness to top coating compared to an ionic film-forming resin such as a cationic resin. Therefore, a new solution of these problems has been required.

Based on the process described in Japanese Patent Kokai Publication No. 345394/2000, it is possible to form an electrodeposition cured coating film with complete layer separation based on inclusion of two different resin components having solubility parameter difference of not less than 1. However, when a solvent-type top coating was applied over the forming cured multi layered coating film, the cured coating does not have sufficient solvent resistance, even if an appropriate curing agent is formulated into electrodeposit composition with the aim of improvement of solvent resistance (i.e. lowering a solvent swelling degree of cured multi layered film). When solvent-type top coating is applied on the cured multi layered coating film with insufficient solvent resistance, the solvent penetrates into the coating film, and the fluidity of top coating composition disappears so that the multi layered coating film would show poor appearance. In addition, ply separation problem due to long term weather deterioration may occur, which may be caused by clear layer separation in multi layers has found. Thus, a method for forming a cured multi layered coating film with good ply-separation resistance on long term weathering is desired.

OBJECTS OF THE INVENTION

A main object of the present invention is to provide a process for forming a cured gradient coating film having excellent coating film appearance, solvent resistance and usefulness for paint industry, especially automobile coating, and a process for forming a multi-layered coating film including the same as one layer. In addition, the present invention also provides a process for forming a multi-layered coating film of intermediate-coating-less system (two-layer coating system) in which a top coating paint is directly coated on an electrodeposition coating film.

SUMMARY OF THE INVENTION

The present invention relates to a process for forming a cured gradient coating film, comprising the steps of:
applying an aqueous electrodeposition coating composition comprising at least two resins and a curing agent, on an electrically conductive substrate, heating a electrodeposition coating film to form a layer separation, and then curing the electrodeposition coating film to form a cured gradient coating film; wherein the resins include one resin component constituting a resin layer (a) in direct contact with air before applying top coating and the other resin component constituting a resin layer (b) in direct contact with the electrically conductive substrate, and a solubility parameter (δa) of a resin component constituting the resin layer (a) in direct contact with air and a solubility parameter (δb) of a resin component constituting the resin layer (b) in direct contact with the electrically conductive substrate have a relationship represented by the following formula:

$$0.2<(\delta b-\delta a)<1.0, \text{ and}$$

the cured gradient coating film comprises the resin layer (a) in direct contact with air, the resin layer (b) in direct contact with the electrically conductive substrate, and a mixing resin layer (c) which is formed between the resin layer (a) and the resin layer (b) and is formed from the resin components each constituting resin layer (a) and (b).

The cation-modified acrylic resin can be synthesized by ring opening addition of acrylic copolymer containing both plural oxirane rings and hydroxyl groups in a molecular with amines. The acrylic copolymer is obtained by copolymerizing (i) glycidyl (meth)acrylate; (ii) hydroxyl group containing acrylic monomer (for example, addition product of hydroxyl group containing (meth)acrylic ester, such as 2-hydroxymethyl (meth)acrylate, 2-hydroxypropyl (meth)acrylate, 2-hydroxybutyl (meth)acrylate, or 2-hydroxyethyl (meth)acrylate; and ε-caprolactone); and (iii) the other acrylic monomer and/or non-acrylic monomer.

The resin component constituting the resin layer (b) preferably contains a cation-modified epoxy resin. On the other hand, the resin component constituting the resin layer (a) preferably contains a cation-modified acrylic resin.

Preferably, the curing agent is a blocked polyisocyanate, and a solubility parameter (δi) of the blocked polyisocyanate, the solubility parameter (δa) and the solubility parameter (δb) have a relationship represented by the following formula:

$$\delta a \leq \delta i \leq \delta b.$$

The present invention also relates to a process for forming a multi-layered coating film, wherein a top coating composition is applied on the above cured gradient coating film and baked. Preferably, the process comprises the steps of:

preheating the electrodeposition coating film at a temperature lower than a temperature necessary for curing the electrodeposition coating film, before curing the electrodeposition coating film, applying the top coating-composition on electrodeposition coating film with wet-on-wet, and baking the electrodeposition coating film and top coating film simultaneously. This process is so-called "two-layer and one bake coating system", and is suitable for further improving coating film appearance.

The term "electrodeposition coating film" as used herein means a coating film before baking to cure, which is applied on a substrate by electrodeposition coating. The term "cured gradient coating film" as used herein means a cured coating film with gradient structure, obtained by baking the electrodeposition coating film to cure. The cured gradient coating film of the present invention has a mixing resin layer (c) present between the resin layer (a) and the resin layer (b), which is made of resin components constituting both the resin layers (a) and (b), whereby the coating film which is composed of the three resin layers (a), (b) and (c) calls as "gradient structure". The term "multi-layered coating film" as used herein means a coating film obtained by applying a top coating composition on the electrodeposition coating film according to the present invention.

DETAILED DESCRIPTION OF THE PREFERRED EMBODIMENTS

In the present invention, a resin component constituting the resin layer (a) in direct contact with air before applying top coating (hereinafter called "the resin component A") and a resin component constituting the resin layer (b) in direct contact with the electrically conductive substrate (hereinafter called "the resin component B") are used, wherein the solubility parameter (δa) of the resin component A and the solubility parameter (δb) of the resin component B have a specific relationship. The symbol "δa" as used herein represents solubility parameter of the resin component A, the symbol "δb" as used herein represents the solubility parameter of the resin component B, and the symbol "Δδ" as used herein represents the difference in solubility parameter between resins δb−δa. In the present invention, the resin component A and the resin component B of which the solubility parameters satisfy the relationship represented by the following formula: $0.2<(\delta b-\delta a)<1.0$ are selected. The resin components which satisfy the relationship are less-compatible with each other. The relationship of $0.2<(\delta b-\delta a)<1.0$ includes: both resin components are almost incompatible with each other in case where the difference in solubility parameter between the resin components Δδ is near 1; and both resin components are slightly incompatible with each other in case where the difference in solubility parameter between the resin components Δδ is more than 0.2. When the resin components which satisfy the relationship represented by the formula: $0.2<(\delta b-\delta a)<1.0$ are used, desired less-compatibility between resins can be obtained.

When the difference in solubility parameter between each resin goes over 0.2, both resins start to show less-compatible with each other, and the coating film starts to exhibit layer separation structure. When the difference goes over 1, the two resins shows incompatible with each other and starts to distinctly separate, to result in clear two-layered structure as described in Japanese Patent Kokai Publication No. 345394/2000. In the present invention, when a substrate is coated with an aqueous electrodeposition coating composition which contains the resin component A and the resin component B and the difference in solubility parameter between these resins is within the range of $0.2<(\delta b-\delta a)<1.0$, a cured gradient coating film that has the resin layer (a) in direct contact with air, the resin layer (b) in direct contact with the electrically conductive substrate, and a mixing resin layer (c) which is formed between the resin layer (a) and the resin layer (b) and is made of the resin components each constituting resin layer (a) and (b) is formed, which has the gradient structure. By contrast, when the difference is not greater than 0.2, the resins show almost complete compatible, and the cured gradient coating film is not obtained.

Selection of the resin component A and the resin component B which satisfy the relationship of $0.2<(\delta b-\delta a)<1.0$ is important for sufficiently curing the two layers, that is resin layer (a) in direct contact with the air before applying top coating and the resin layer (b) in direct contact with the electrically conductive substrate. In the present invention, both the resin components A and B are cured by a curing agent. A blocked polyisocyanate is preferably used as a curing agent, as discussed below. Since the blocked polyisocyanate inherently has specific solubility parameter ($\delta i$), if the difference in solubility parameter $\Delta\delta$ between the resin components A and B is too great, ununiform presence of curing agent that one resin layer contains too much curing agent and the other rein layer insufficiently contains it. This phenomenon may lead to the defects such as insufficiency curing of the resin layers, degradation of solvent resistance, weather-resistance and corrosion resistance. In the present invention, selecting the resin component A and the resin component B which satisfy the relationship of $0.2<(\delta b-\delta a)<1.0$ eliminates the ununiform presence of curing agent in resin layer A and B.

The term "solubility parameter $\delta$" as used herein is generally called by persons skilled in the art as SP, which shows a measuring criterion indicating degree of hydrophilicity or hydrophobicity and is an important criterion to consider compatibility between resins. A value of solubility parameter can be determined by a method called as turbidimetric method, which is well known to the art (K. W. Suh, D. H. Clarke J. Polymer Sci., A-1, 5, 1671 (1967)). The solubility parameter $\delta$ used herein is the parameter measured by the turbidimetric method. The solubility parameter in the turbidimetric method can be measured by e.g., dissolving a specific amount by weight of resin in specific amount of good solvent such as acetone; adding poor solvent to the solution to precipitate the resin; measuring the amount of adding poor solvent until suspension occurs; calculating solubility parameter with the measurement value based on well known mathematical formula described in above Reference.

The resin component A is also the resin component which induce separation of gradient layers. The component A which satisfy the desired solubility parameter's relationship preferably includes cation-modified acrylic resin.

The cation-modified acrylic resin can be synthesized by ring opening addition polymerization of acrylic copolymer containing both plural oxirane rings and hydroxyl groups in a molecular with amines. The acrylic copolymer is obtained by copolymerizing (i) glycidyl (meth)acrylate; (ii) hydroxyl group containing acrylic monomer (for example, addition product of hydroxyl group containing (meth)acrylic ester, such as 2-hydroxymethyl (meth)acrylate, 2-hydroxypropyl (meth)acrylate, 2-hydroxybutyl (meth)acrylate, or 2-hydroxyethyl (meth)acrylate; and $\epsilon$-caprolactone); and (iii) the other acrylic monomer and/or non-acrylic monomer.

Examples of the other acrylic monomers (iii) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, cyclohexyl (meth)acrylate, 2-ethylhexyl (meth)acrylate, lauryl (meth)acrylate and isobornyl (meth)acrylate. Examples of the non-acrylic monomers include styrene, vinyl toluene, α-methylstyrene, (meth)acrylonitrile, (meth)acrylamide and vinyl acetate.

An oxirane ring-containing acrylic resin formed from the glycidyl (meth)acrylate can be converted into a cation-modified acrylic resin by opening all oxirane rings in the epoxy resin by the reaction with primary amine, secondary amine or an acid salt of tertiary amine.

The cation-modified acrylic resin may be directly synthesized by a method of copolymerizing acrylic monomer having amino group and the other monomer. In the method, the glycidyl (meth)acrylate is replaced with amino group containing acrylic monomer, such as N,N-dimethylaminoethyl (meth)acrylate, N,N-dimethylaminopropyl (meth)acrylamide and N,N-di-t-butylaminoethyl (meth)acrylate, and the cation-modified acrylic resin can be obtained by copolymerizating the amino group containing acrylic monomer, the hydroxyl group containing acrylic monomer and the other acrylic monomer and/or non-acrylic monomer.

The resulting cation-modified acrylic resin may be self-crosslinkable acrylic resin which may be obtained by incorporating a blocked isocyanate group to the acrylic polymer backbone by an addition reaction with a half-blocked diisocyanate compound, as described in Japanese Patent Kokai Publication No 333528/1996.

Preferably, the resin component A is designed to have hydroxyl number of 50 to 150. When the hydroxyl number is lower than 50, the curing ability of the resulting coating film is degraded. On the other hand, when the hydroxyl number is higher than 150, excess hydroxyl groups remain in the coating film after curing, which degrades water resistance. It is desired for the resin component A to have a number average molecular weight of 1,000 to 20,000. When the number average molecular weight is lower than 1,000, the physical properties of the resulting cured coating film, such as solvent resistance, are poor. On the other hand, when the number average molecular weight is higher than 20,000, the viscosity of the resin solution is high, and it is difficult to handle in operation, such as emulsification and dispersion of the resulting resin. In addition, the appearance of the resulting coating film is poor. The resin component A may be used with alone or a combination of two or more resins.

As used herein, the resin component constituting the resin layer (b) in direct contact with the electrically conductive substrate (the resin component B) is required to have the property of giving corrosion resistance to an electrically conductive substrate. An example of the resin is a cation-modified epoxy resin which is well known in the electrodeposition coating field, and may be preferably used in the present invention. Generally, the cation-modified epoxy resin is prepared by opening all epoxy rings in a molecule of the epoxy resin as a starting material by the reaction with amines, such as primary amine, secondary amine and an acid salt of tertiary amine. A typical example of the starting material includes polyphenol polyglycidyl ether type epoxy resin, which is a reaction product of a polycyclic phenol compound, such as bisphenol A, bisphenol F, bisphenol S, phenol novolak, and cresol novolak, with epichlorohydrin. Another example of the starting material resin includes an epoxy resin having an oxazolidone ring described in Japanese Patent Kokai Publication No. 306327/1993. The epoxy resin is obtained by reacting a diisocyanate compound or a bis-urethane compound (obtained by blocking an NCO group of a diisocyanate compound with lower alcohol, such as methanol or ethanol) with epichlorohydrin.

The above starting material resin, before the ring-opening reaction of epoxy rings with amines, can be chain-extended by using difunctional polyester polyol, polyether polyol, bisphenol, dibasic carboxylic acid and the like. Similarly, a monohydroxyl compound, such as 2-ethylhexanol, nonyl phenol, ethylene glycol mono-2-ethylhexylether, and propylene glycol mono-2-ethylhexylether can also be added to a part of epoxy rings, before the ring-opening reaction of epoxy rings with amines, in order to control molecular weight or amine equivalent and to improve heat flow property etc.

Examples of the amines, which can be used for ring-opening an epoxy group and introducing an amino group thereto, include primary amine, secondary amine, or an acid salt of tertiary amine, such as butylamine, octylamine, diethylamine, dibutylamine, methylbutylamine, monoethanolamine, diethanolamine, N-methylethanolamine, an acid salt of triethylamine and an acid salt of N,N-dimethylethanolamine. A secondary amine having ketimine blocked primary amino group, such as aminoethylethanolamine methylisobutylketimine can be also used. In order to ring-open all epoxy rings, it is required to react the amines with epoxy rings in at least equivalent amount.

It is preferred that the cation-modified epoxy resin has number average molecular weight of 1,500 to 5,000. When the number average molecular weight is lower than 1,500, the physical properties of the resulting cured coating film, such as solvent resistance and corrosion resistance may be poor. On the other hand, when the number average molecular weight is higher than 5,000, the resin solution has poor controllability of viscosity and makes it difficult to synthesize the resin. It is difficult to handle in operation, such as emulsification and dispersion of the resulting resin. In addition, since the resin solution has high viscosity, flow property when curing with heating is poor on curing under applied heat, and degrades appearance of the resulting coating film.

It is desired for the resin component B to be designed to have a hydroxyl number of 50 to 250. When the hydroxyl number is lower than 50, the curing ability of the resulting coating film is degraded. On the other hand, when the hydroxyl number is higher than 250, excess hydroxyl groups remain in the coating film after curing, which may degrade water resistance. In addition, it is desired for the resin component B to have a softening point of not less the 80° C., preferably not less than 100° C., in order to accomplish a balance at high level between the solvent resistance, weather resistance and corrosion resistance of the cured coating film, and appearance of the coating film, which is the object of the present invention. The resin component B may be used alone, or in combination of two or more resins.

The solubility parameter ($\delta a$) of the resin component A and the solubility parameter ($\delta b$) of the resin component B have the relationship of $0.2<(\delta b-\delta a)<1.0$ as described above. Solubility parameter shows a measuring criterion indicating degree of hydrophilicity or hydrophobicity, and the resin component B having greater $\delta b$ than $\delta a$ in the range of $0.2<(\delta b-\delta a)<1.0$ generally have high affinity with the surface of electrically conductive substrate having high surface polarity (such as metal) rather than air-side surface. Consequently, the resin component B tends to form a resin layer on the surface of electrically conductive substrate such as metal materials. On the other hand, the resin component A moves to air-side to form a resin layer. The difference in solubility parameter of both resins probably promotes to stratify the resin layer. When the solubility parameters satisfy the relationship, the resin components A and B give the gradient structure in a cured coating film to form a desired cure gradient coating film, that is to say, a electrodeposition coating film with gradient-layer separation structure. For adjusting no within the range of $0.2<\Delta\delta<1.0$, the solubility parameters of the resin components A and B are measured and selected to satisfy the relationship.

The gradient structure of the resin layer can be confirmed by observing the cross-sectional area of the electrodeposition coating film using a video microscope, or a scanning electron microscope (SEM). The resin components comprising each resin layer can be identified using, for example, a Fourier-transformed infrared attenuated total reflection (FTIR-ATR) spectrophotometer.

A mixing ratio of the resin component A and the resin component B in the aqueous coating composition is preferably within the range of 70/30 to 30/70 by weight, more preferably 60/40 to 40/60 by weight. Ratios outside do not lead gradient layer structure and often generate a sea-island structure (or micro-domain structure) in which the resin with higher mixing ratio forms a continuous layer and the resin with lower mixing ratio forms a dispersing layer.

The resin components A and B are emulsified, or neutralized with organic acids such as acetic acid, formic acid, lactic acid with the optimum amount of neutralization of amino group in each resin, and dispersed in water as a cationized emulsion. Each resin component A and B is preferably emulsified separately. However, the resin components together may be emulsified after mixing them. A curing agent can be contained in any resin emulsion in the step of emulsifying and dispersing. The curing agent may include any type of resin as long as it is possible to cure each resin component on heating, but preferred is a blocked polyisocyanate which is generally used as a curing agent of electrodeposition coating.

Examples of the useable polyisocyanates as a starting material of the blocked polyisocyanate include aliphatic diisocyanates, such as hexamethylene diisocyanate (containing trimer), tetramethylene diisocyanate and trimethylhexamethylene diisocyanate; cycloaliphatic diisocyanates, such as isophorone diisocyanate and 4,4'-methylene bis(cyclohexylisocyanate); aromatic diisocyanates such as 4,4'-diphenylmethane diisocyanate, tolylene diisocyanate and xylylene diisocyanate; and the like. The blocked polyisocyanate can be obtained by blocking the polyisocyanates with a suitable block agent.

Examples of the useable block agents include. monovalent alkyl (or aromatic) alcohols, such as n-butanol, n-hexyl alcohol, 2-ethylhexanol, lauryl alcohol, phenol carbinol and methyl phenyl carbinol; cellosolves, such as ethylene glycol monohexyl ether and ethylene glycol mono-2-ethylhexyl ether; phenols, such as phenol, para-t-butyl phenol, cresol; oximes, such as dimethyl ketoxime, methylethyl ketoxime, methyl isobutyl ketoxime, methyl amyl ketoxime and cyclohexanone oxime; and lactams represented by ε-caprolactam and γ-butyrolactam. Particularly, in view of curing property of resins, the block agents of oximes and lactams are preferably used because of their dissociation property at low temperature. In the preparation of blocked polyisocyanate, the one or more blocking agents selected form the group consisting of oximes and lactams are preferably used in an equivalent amount of more than 60%, more preferably more than 65%, based on the total weight of the blocking agents used. The use of the blocking agent having dissociation property at low temperature within the above weight range makes possible the control of the degree of cross-linking of the obtained cured coating film to the desired degree. This procedure makes possible the control of solvent swelling degree of the cured coating film to the desired level, as described below.

It is desired that the isocyanate previously are blocked by one or more types of the blocking agents. A blocking ratio can preferably be 100% in order to secure storage stability of a coating, unless it is modification reacted with the each resin component.

It is desired for a weight ratio of the blocked polyisocyanate based on the total weight of the resin components A and B, which varies depending to degree of crosslinking necessary to an application of the cured coating film, to be within the range of 15 to 40% by weight in view of physical properties of the coating film. When the weight ratio is smaller than 15% by weight, the curing of the coating film is degraded, and the physical properties of the coating film, such as mechanical strength, are degraded. On the other hand, when the weight ratio is larger than 40% by weight, the coating film is overcured, and the physical properties of the coating film, such as impact resistance, are degraded. The blocked polyisocyanate may be used in combination of two or more in order to adjust the physical properties, degree of curing and curing temperature of the coating film.

In order to allow the blocked polyisocyanate to be distribution dissolved in each layer of the electrodeposition coating film after stratifying and to accomplish a balance of the curing of the resin layer (a) comprising the resin component A and the simultaneous curing of the resin layer (b) comprising the resin component B, it is important that the solubility parameter ($\delta i$) of the blocked polyisocyanate satisfies the relationship represented by the following formula:

$$\delta a \leq \delta i \leq \delta b.$$

The relationship is an important guiding principle for accomplishing the present invention so as to improve the interlaminar bonding strength of the cured gradient layered electrodeposition coating film and the appearance of the multi-layered coating film after applying the intermediate coating or the top coating.

In the present invention, the resin layer (a) mainly formed from the resin component A preferably has a dynamic glass transition temperature Tg(a) of 40 to 90° C., more preferably 50 to 80° C. When the dynamic glass transition temperature Tg(a) is higher than 90° C., the flexibility and impact resistance of the resin layer (a) start to degrade. On the other hand, when the dynamic glass transition temperature Tg(a) is lower than 40° C., the corrosion resistance starts to regrade. The resin layer (b) mainly formed from the resin component B preferably has a dynamic glass transition temperature Tg(b) of 100 to 150° C., more preferably 110 to 140° C. When the dynamic glass transition temperature Tg(b) is higher than 150° C., the resin layer (b) is brittle, and the impact resistance is degraded. On the other hand, when the dynamic glass transition temperature Tg(b) is lower than 100° C., the corrosion resistant may be poor. The mixing resin layer (c) constituting the resin components each constituting resin layer (a) and (b) preferably has a dynamic glass transition temperature Tg(c) of 70 to 120° C., more preferably 80 to 110° C., and the dynamic glass transition temperature Tg(c) is within the intermediate-range between Tg(a) and Tg(b).

In the present invention, the use of the resin component A and B whose solubility parameters $\delta a$ and $\delta b$ have the relationship of $0.2<(\delta b-\delta a)<1.0$, and the use more than 60% by weight of a blocking agent dissociating at low temperature make possible the control of solvent swelling degree of the obtained cured coating film to not greater than 30%.

The above solvent swelling degree can be calculated based on the following formula:

$$\text{solvent swelling degree}=\{(W1-W0)/W0\}\times 100$$

wherein, W0 represents the weight of a cured gradient coating film before immersion into solvent, and W1 represents the weight of a cured gradient coating film after immersion into solvent at 20° C. in 5 days.

The solvent used herein is preferably a combination solvents which has the composition ratio almost the same as the composition ratio of solvents including a solvent-type top coating composition. However, when methyl isobutyl ketone only is used as alternative solvent, the solvent swelling degree is measured with good repeatability. Therefore, in the present invention, methyl isobutyl ketone is used in the measurement of solvent swelling degree.

When solvent swelling degree of the cured coating film is not greater than 30%, preferably 20%, a multi-layered coating film which is coated with top coating composition, particularly solvent-type top coating composition on the cured coating film has a improved appearance. When solvent swelling degree of the cured coating film is greater than 30%, the cured coating film starts to absorb the solvent in top coating composition, and flow property of coating at baking is deteriorated, and inferior appearance of multi-layered coating film will be obtained.

The cured gradient coating film obtained according to the present invention has the structure which is composed of pseudo three layers across the depth. The structure has the resin layer (a) in direct contact with air, the resin layer (b) in direct contact with the electrically conductive substrate, and a mixing resin layer (c) which is formed between the resin layer (a) and the resin layer (b) and is formed from the resin components each constituting resin layer (a) and (b). In addition, the structure is composed a uniform layer of the resin component A, a mixing layer of the resin component A and B, and a uniform layer of the resin component B in the direction of the depth from the interface of air and coating film to the interface of coating film and electrically conductive substrate in order. This structure improves adhesiveness between the resin layer in direct contact with air and the resin layer in direct contact with the electrically conductive substrate, such as evaluated peel resistance on weathering. Therefore, the problem of peeling on weathering deterioration is relieved in the weather-resistance test of two-layer coating system (intermediate-coating-less system). The use of the method according to the present invention in automobile coating can provide the automobile coating film with weather-resistance for a prolonged period.

Optionally, a portion of the resin component A may replace polyester resin. The replacement of polyester can improve adhesiveness between the cured gradient coating film and top coating film and appearance of multi-layered coating film. The polyester resin as used herein can be obtained by the conventional dehydration condensation of polybasic acid and polyol. The "polyester resin" as used herein means the polyester resin which has acid group on the backbone or side chain of the resin.

The solubility parameter ($\delta a'$) of the above polyester resin should satisfy a relationship represented by the following formula: $0.2<(\delta b-\delta a')<1.0$.

The amount of acid group in polyester resin is preferably the range of acid value from 3 to 20, more preferably from 5 to 15. When its acid value is less than 3, adhesiveness of top coating film may be deteriorated. When its acid value is greater than 20, curing inferiority subject to using blocked polyisocyanate as a curing agent or difficulty of forming paste of pigment may be occurred.

A hydroxyl value may preferably be within the range of 50 to 200. If a hydroxyl value is less than 50, curing defect in coating film may occur, while if it value is more than 200, excess hydroxyl groups remain in the coating film after curing to result in decrease of water resistance. Number-average molecular weight is preferably within the range of 1,000 to 10,000. If number-average molecular weight is less than 1,000, properties, such as solvent resistance of a cured and formed coating film are inferior. On the other hand, values of more than 10,000 make it difficult to handle on operation, such as emulsification and dispersion of an obtained resin, as well as deteriorate appearance of the resulting electrodeposition coating film. Additionally, the polyester resin may be one type, but can be two or more types to make balance of performance of the coating film.

The above polyester resin can be produced by reacting polyol component (such as, neopentyl glycol, trimethylol propane, ethylene glycol, diethylene glycol, propylene glycol, 1,6-hexanediol, glycerin and pentaerythritol) with polybasic acid component (such as, phthalic acid, isophthalic acid, trimellitic acid, terephthalic acid, pyromellitic acid, hexahydrophthalic acid, succinic acid, adipic acid, and sebacic acid and anhydrides thereof). Optionally, lactones, such as δ-butyrolactone, and ε-caprolactone, any types of saturated and/or unsaturated fatty acids as modified, such as coconut oil fatty acid, tung tree oil fatty acid, soybean oil fatty acid, and linseed oil fatty acid and mono-, di-, or tri-glycerides thereof, and Carjurer-E-10 (monoepoxide having a branched alkyl group with 10 carbon atoms, available from Shell Chem. Co.) may be used according to conventional methods.

The above polyester resin may contain a urethane bond in suitable quantity in part. The urethane bond can be introduced by reacting diisocyanates, such as 4,4'-diphenylmethane diisocyanate, tolylene diisocyanate, hexamethylene diisocyanate and isophorone diisocyanate, with a hydroxyl group of polyester polyol which has hydroxyl groups at both ends of a molecular chain, such as δ-butyrolactone, or ε-caprolactone to form urethane bonds, and partly extending chains. The above resin is used as a part of the above polyol components to incorporate a urethane bond on the backbone or side chain of the resin.

In addition, the above polyester resin preferably contains a tertiary carboxyl group on the backbone or side chain of the resin. The tertiary carboxyl group is one in which no hydrogen is bonded to a carbon atom directly bonded with a carboxyl group. Since the tertiary carboxyl group has a low activity as acid group, it is introduced into polyester resin to easily control solubility parameter of a resin component. The polyester resin contains a tertiary carboxyl group in a molecule, so that interaction between acid groups in the resins lowers to enhance heat flow property of the coating film. Accordingly, smoothness of the coating film during heating and curing is secured so as to improve appearance, whatever pigment dispersibility varies. Further, when melamine resin is used as a curing agent, it is expected to act as catalyst in the curing reaction of the melamine resin.

The polyester resin containing a tertiary carboxyl group on the backbone or side chain of the resin can be produced by using a diol compound containing a tertiary carboxyl group, such as 2,2'-dimethylol propionic acid, 2,2'-dimethylol butanic acid, 2,2'-dimethylol hexanic acid, 2,2'-dimethylol octanic acid or 2,2'-dimethylol decanic acid as a portion of the above polyol component. The amount of the diol compound containing a tertiary carboxyl group is controlled such that the above acid value, i.e. a proportion of tertiary carboxyl group to a total acid value of polyester resin, is preferably 80% or more, more preferably, almost 100%.

Optionally, the above polyester resin can be modified to a self-crosslinking type resin by additional reacting with a half-blocked diisocyanate compound or partial co-condensed with a melamine resin. The self-crosslinked resin can be preferably used in the present invention, because of superiority in curing reactivity.

When the above polyester resin is added to the aqueous electrodeposition coating composition, the polyester resin is preferably dispersed in emulsification together with the resin components A and/or B, because polyester resin is not dispersed in aqueous solution. When the polyester resin is dispersed in emulsification together with the resin component A and/or B, the resins will be dispersed in core-shell structure which the resin component A and/or B constitute shell part and polyester resin constitutes core part.

The replacement amounts of polyester resin are preferably the range of 5 to 40 weight parts based on the total amounts 100 weight parts of the resin component A. When the replacement amount of polyester resin is less than 5 weight parts, no improvement of adhesiveness of top coating film nor appearance of multi-layered coating film may be obtained. On the other hand, when the amounts are greater than 40 weight parts, the core part of emulsion in aqueous solution may greaten excessively, and the preparation of emulsion may become difficult.

The pigment used in the process of the present invention is not limited as long as it has been conventionally used for a coating. Examples thereof include a coloring pigment, such as carbon black, titanium dioxide and graphite; an extender pigment, such as kaolin, aluminum silicate (clay) and talc; a rust preventive pigment, such as aluminum phosphomolybdate. The important pigments for dispersing in the cured gradient coating film after electrodeposition coating are titanium dioxide. Titanium dioxide have high opacifying properties and are cheap, thus titanium dioxide are ideal for use in cured gradient coating film of automobile coating. The pigment may be used alone, but it is generally used in combination of two or more depending on its application.

The above pigment is preferably within the P/V ratio ranging from 1/10 to 1/3, wherein P represents the weight of total amount of pigments and V represents the weight of total vehicle component except pigments in the aqueous coating composition. The vehicle component except pigments used herein means total solid component constituting coating composition except pigments (i.e. the main resin component A and B, their curing agents and pigment dispersing resins). When the P/V is less than 1/10, the pigment is not contained sufficiently, which degrades prevention of corrosion factors, such as light and water, to result in deterioration of weather resistance and corrosion resistance of practical level. When P/V is greater than 1/3, excess amount of pigment may cause increase of viscosity when curing and degrade flow property to provide poor appearance. This ratio P/V is substantively the same as the weight of total vehicle component based on the weight of all pigments in the aqueous electrodeposition according to the present invention.

Furthermore, pigment concentration in the coating film may have a gradient. The gradient may include the resin layer (b) with higher pigment concentration which contains the resin component B, the resin layer (a) with lower pigment concentration which contains the resin component A, and a mixing resin layer (c) which contains the resin component A and B and lies between the resin layer (a) and the resin layer (b). In order to forming the gradient, a pigment dispersing resin which is compatible with the resin component B and is less-compatible with the resin component A is preferably used to prepare a pigment dispersion paste, then to prepare the aqueous electrodeposition coating composition containing the paste. Especially, a solubility parameter (δp) of the pigment dispersing resin which satisfies the relationship: the difference between δp and δb is not greater than 0.2, and the difference between δp and δa is greater than 0.2, is preferably used to form the gradient. When the difference between δp and δb goes over 0.2, compatibility between the pigment dispersing resin and the resin component B may not be achieved, so the pigment's orientation for resin layer (b) containing the resin component B is hardly induced. It can provide the coating film with less corrosion resistance. On the other hand, when the difference between δp and δa is not greater than 0.2, complete compatibility between the pigment dispersing resin and the resin component A may be achieved, so the pigment's orientation for resin layer (a) containing the resin component A can be induced. It can provide the coating film with less appearance.

The kind and component of the pigment dispersing resin are preferably the same as the resin component B or the similar to the resin component B, and satisfies the above relationship of solubility parameter. The suitable amount of the pigment dispersing resin based on the pigment is within the range of 5 to 40 weight %. When the amount of the pigment dispersing resin is less than 5 weight %, the dispersion stability of the pigment is not sufficiently obtained. On the other hand, when the amount of the pigment dispersing resin is greater than 40 weight %, the coating film with difficult control of the curing property may be obtained.

The aqueous electrodeposition coating composition used in the present invention contains at least two different resin components (the resin components A and B) that are less-compatible with each other, curing agent and the pigment. The one process for preparing the coating composition includes the step of: mixing the resin components A and B, the pigment (the pigment dispersing paste) and the curing agent together, and emulsifying the mixing component in an aqueous medium with a neutralizing agent. Other process for preparing the coating composition includes the step of: emulsifying each of the resin components in the aqueous medium with neutralizing agent and suitable the curing agent separately, and blending the obtained emulsions with the blending ratio satisfying the aforementioned ratio. The preferable process is the process including the step of emulsifying each of the resin, this process yields the coating composition with excellent stability. The example of the neutralizing agent includes inorganic acids such as hydrochloric acid, nitric acid, phosphoric acid, and organic acids such as formic acid, acetic acid, lactic acid, sulfaminic acid and acetylglycinic acid.

It is desired for the total solid content of the aqueous electrodeposition coating composition to be adjusted within the range of 15 to 25% by weight. In order to adjust the total solid content, it is preferable to use an aqueous medium, such as water or a mixture of water and hydrophilic organic solvent. The coating composition may contain a small amount of additive. Examples of the additives include ultraviolet absorbing agent, oxidation inhibiting agent, surface active agent, smoothing agent for the surface of the coating film, curing accelerator (such as organic tin compound) and the like. Among these additives, preferably, the organic tin compound of curing accelerator can be added to the coating composition within the range of 0.5 to 5% by weight based on the total solid content of the coating composition to obtain the cured gradient coating film with desired degree of cross-linking.

In order to form the cured gradient coating film according to the present invention, the electrically conductive substrate to be coated is connected to a cathode electrode, and the electrodeposition coating is conducted at a bath temperature of 15 to 35° C. and an applied voltage of 100 to 400 V to form the electrodeposition coating film having a dry thickness of 10 to 50 μm, preferably 20 to 40 μm. It is then baked at 140 to 200° C., preferably 160 to 180° C. for 10 to 30 minutes. This baking directs the resin component A, the resin component B and a pigment dispersing resin contained in the aqueous electrodeposition coating composition depending on inherent solubility parameter of each resin. When the coating film is cured after baking, an electrodeposition cured film with the gradient structure is formed, in which the resin component A lies at the side in direct contact with air, and the resin component B lies at the side in direct contact with the electrically conductive substrate, furthermore the pigment mainly lies in the layer containing the resin component B. A heating process of the baking includes: the way of putting the coated substrate in a pre-heated oven with the controlled required temperature, or the way of heating an oven after the coated substrate is put in an oven.

The process of applying top coating composition on the cured coating film and baking provides the formation of the multi-layered coating film with excellent adhesion and appearance based on the two wet coating systems. This method of forming the multi-layered coating film is the coating process of two-layer and two-bake system. The top coating composition may be any types, such as solvent type, aqueous type and powder. Using the top coating composition of solvent type is preferable to provide the effect of the present invention.

In addition, based on the requirement of energy saving in automobile coating, reduced baking process is usually carried out. Thus, the two-layer and one-bake coating process which includes the process of applying top coating composition on an uncured coating film with wet on wet, and simultaneously baking the uncured electrodeposition coating film and the top coating film is carried out. This two-layer and one-bake coating process may be used to form the gradient coating film. In this two-layer and one-bake coating process, in order to obtain a desired multi-layered coating film without damaging appearance of coating, pre-heating may be carried out before top coating is applied. The temperature of preheating is the temperature which generates layer separation in the electrodeposition coating film and is less than the temperature required for the curing of the electrodeposition coating film. Preferably, the preheating is usually carried out within the range of 60 to 130° C.

The present invention provides the process for forming the cured gradient coating film and the process for forming the multi-layered coating film containing the same as one layer, which is useful for paint industry, especially automobile coating. The present invention also provides the process for forming the multi-layered coating film with intermediate-coating-less system (two-layer coating system) in which the top coating composition is directly coated on the electrodeposition coating film. The cured gradient coating film and multi-layered coating film according to the present invention have excellent coating film appearance, solvent resistance, weather-resistance and corrosion resistance equal to the conventional three-coat coating film. In addition, the process for forming the cured gradient coating film and the process for forming the multi-layered coating film containing the same according to the present invention have an important role in forming a new coating system with reduced step, cost saving, energy consumption saving and environmental load reducing.

EXAMPLES

The present invention will be further explained in detail in accordance with the following examples, but it is not construed as limiting the present invention to these examples. In the examples, "part" and "%" are based on weight unless otherwise specified.

Preparation of Electrodeposition Coating
Composition Production Example 1 (Production of
Blocked Polyisocyanate Curing Agent)

A reaction vessel equipped with a stirrer, a nitrogen-gas inlet, a condenser and a thermometer was charged with 222 parts of isophorone diisocyanate and diluted with 56 parts of methyl isobutyl ketone. Then, 0.2 parts of dibutyltin dilaurate was added thereto and heated to 50° C., to which 17 parts of methyl ethyl ketoxime was added while keeping a temperature of the content not more than 70° C. It was then kept at 70° C. for one hour until an absorption of isocyanate moiety in infrared absorption spectrum substantially disappeared. It was diluted with 43 parts of n-butanol to obtain a blocked polyisocyanate curing agent solution having the solubility parameter δi of 11.8 and a solid content of 70% by weight.

Productive Example 2 (Production of Blocked
Polyisocyanate Curing Agent)

A reaction vessel equipped with a stirrer, a nitrogen-gas inlet, a condenser and a thermometer was charged with 199 parts of hexamethylene diisocyanate trimer and diluted with 39 parts of methyl isobutyl ketone. Then, 0.2 parts of dibutyltin dilaurate was added thereto and heated to 50° C., to which 58 parts of methyl ethyl ketoxime (67 equivalent % based on the total blocking agent) and 57 parts of ethyleneglycol mono-2-ethylhexyl ether (33 equivalent % based on the total blocking agent) were added while keeping a temperature of the content not more than 70° C. It was then kept at 70° C. for one hour until an absorption of isocyanate moiety in infrared absorption spectrum substantially disappeared. It was diluted with 43 parts of n-butanol to obtain a blocked polyisocyanate curing agent solution having the solubility parameter δi of 11.1 and a solid content of 80% by weight.

Productive Example 3 (Production of
Cation-Modified Epoxy Resin Emulsion (Resin
Component B))

A reaction vessel equipped with a stirrer, a decanter, a nitrogen-gas inlet, a thermometer and a dropping funnel was charged with 2,400 parts of bisphenol A type epoxy resin having epoxy equivalent of 188 (available from Dow Chemical Co. as DER-331J), 141 parts of methanol, 168 parts of methyl isobutyl ketone and 0.5 parts of dibutyltin dilaurate, and mixed uniformly at 40° C. to dissolve. Then, 320 parts of 2,4-/2,6-tolylene diisocyanate (mixing weight ratio of 80/20) was added dropwise over 30 minutes to exothermically heat to 70° C. To the content, 5 parts of N,N-dimethylbenzylamine was added and heated to a temperature of 120° C. at which reaction continued for 3 hours with removing methanol until epoxy equivalent reached to 500. Then, 644 parts of methyl isobutyl ketone, 341 parts of bisphenol A and 413 parts of 2-ethylhexanoic acid were added thereto and kept at 120° C. to complete reaction until epoxy equivalent reached to 1,070, followed by cooling the content to 110° C. At 110° C., a mixture of 241 parts of diethylenetriamine diketimine (methyl isobutyl ketone solution having a solid content of 73 weight %) and 192 parts of N-methylethanolamine was added and reacted for one hour to obtain a cation-modified epoxy resin. The cation-modified epoxy resin had number average molecular weight of 2,100, hydroxyl value of 160, resin softening point of 130° C. according to JIS-K-5665, solubility parameter δb of 11.4.

The determination of infrared spectrum showed that the resin had oxazolidone ring by an absorption at 1,750 cm−1.

Into the cation-modified epoxy resin solution, 1,834 parts of blocked polyisocyanate curing agent obtained in Production Example 1 and 90 parts of acetic acid were added. Then ion-exchanged water was added thereto up to non-volatile content of 32 wt %, and condensed at a reduced pressure up to non-volatile content of 36 wt % to obtain aqueous emulsion particles mainly containing cation-modified epoxy resin (hereinafter referred to E1).

Production Example 4 (Production of
Cation-Modified Acrylic Resin Emulsion (Resin
Component A1))

A reaction vessel equipped with a stirrer, a condenser, a nitrogen-gas inlet, a thermometer and a dropping funnel was charged with 50 parts of methyl isobutyl ketone kept at 115° C. with heating under nitrogen atmosphere. A mixture of 20.2 parts of 2-hydroxyethyl methacrylate, 17.3 parts of styrene, 30 parts of N,N-dimethylaminoethyl methacrylate, 29.3 parts of n-butyl acrylate, 3.2 parts of methyl methacrylate, and 4 parts of t-butyl peroctoate was added thereto dropwise over 3 hours with the dropping funnel, to which 0.5 parts of t-butyl peroctoate was added dropwise and kept at 115° C. for 1.5 hours to obtain a cation-modified acrylic resin having solid content of 65 wt %, number average molecular weight of 6,400, hydroxyl value of 87, and solubility parameter δa of 11.0.

Into the cation-modified acrylic resin solution, 40 parts of the blocked polyisocyanate curing agent obtained in Production Example 2 was added and mixed for 30 minutes, to which 10 parts of ethyleneglycol n-monobutyl ether and 3 parts of acetic acid were added. Then ion-exchanged water was added thereto up to non-volatile content of 32 wt %, followed by condensing it at a reduced pressure up to non-volatile content of 36 wt % to obtain aqueous emulsion particles containing cation-modified acrylic resin (hereinafter referred to E2).

Production Example 5 (Production of
Cation-Modified Acrylic Resin Emulsion (Resin
Component A2))

A reaction vessel equipped with a stirrer, a condenser, a nitrogen-gas inlet, a thermometer and a dropping funnel was charged with 50 parts of methyl isobutyl ketone kept at 115° C. with heating under nitrogen atmosphere. A mixture of 20.2 parts of 2-hydroxyethyl methacrylate, 26.8 parts of n-butyl acrylate, 4.1 parts of 2-ethylhexyl methacrylate, 30 parts of N,N-dimethylaminoethyl methacrylate, 18.9 parts of styrene and 4 parts of t-butyl peroctoate was added thereto dropwise over 3 hours with the dropping funnel, to which 0.5 parts of t-butyl peroctoate was added dropwise and kept at 115° C. for 1.5 hours to obtain a cation-modified acrylic resin having solid content of 65 wt %, number average molecular weight of 6,500, hydroxyl value of 87, and solubility parameter δa of 10.7.

Into the cation-modified acrylic resin solution, 40 parts of the blocked polyisocyanate curing agent obtained in Production Example 2 was added and mixed for 30 minutes, to which 10 parts of ethyleneglycol n-monobutyl ether and 3 parts of acetic acid were added. Then ion-exchanged water was added thereto up to non-volatile content of 32 wt %, followed by condensing it at a reduced pressure up to non-volatile content of 36 wt % to obtain aqueous emulsion particles containing cation-modified acrylic resin (hereinafter referred to E3).

Production Example 6 (Production of Polyester Resin)

A reaction vessel equipped with a stirrer, a condenser, a decanter, a nitrogen-gas inlet, a thermometer and a dropping funnel was charged with 61 parts of hydroxypivalylic acid neopentyl glycol ester, 180 parts of trimethylolpropane, 152 parts of neopentylglycol, 218 parts of hexahydrophthalic acid, 156 parts of isophthalic acid, 50 parts of 2,2'-dimethylol butanoic acid, 104 parts of ε-caprolactone, 79 parts of Carjurer E (monoepoxide, available from Shell Chemical Co.), 2 parts of dibutyltin oxide as reaction catalyst and 30 parts of xylene as reflux solvent, and kept at 150° C. under nitrogen atmosphere. The mixture was heated to 210 to 230° C. to react conduct condensation reaction for about 5 hours. Then 240 parts of methyl isobutyl ketone was added as a diluent solvent.

The obtained polyester resin had solid content of 80%, number average molecular weight of 1,000, acid value of 8, hydroxyl value of 180, solubility parameter δa' of 11.0.

Production Example 7 (Production of Cation-Modified Acrylic Resin Emulsion (Resin Component A4))

To 123 parts of cation-modified acrylic resin obtained in Production Example 4, 25 parts of polyester resin obtained in Production Example 6 and 40 parts of blocked polyisocyanate curing agent obtained in Production Example 2 were added and mixed for 30 minutes. Ten parts of ethyleneglycol mono-2-ethylhexyl ether and 3 parts of acetic acid were added thereto, to which ion-exchanged water was added up to non-volatile content of 32 wt %, and condensed at a reduced pressure up to non-volatile content of 36 wt % to obtain aqueous emulsion particles mainly containing cation-modified acrylic resin (hereinafter referred to E4).

Comparative Production Example 1 Cation-Modified Acrylic Resin Emulsion (Resin Component A5)

A reaction vessel equipped with a stirrer, a condenser, a nitrogen-gas inlet, a thermometer and a dropping funnel was charged with 50 parts of methyl isobutyl ketone kept at 115° C. with heating under nitrogen atmosphere. A mixture of 20.2 parts of 2-hydroxyethyl methacrylate, 27.8 parts of 2-ethylhexyl methacrylate, 30 parts of N,N-dimethylaminoethyl methacrylate, 12.7 parts of n-buthylacrylate, 9.3 parts of styrene and 4 parts of t-butyl peroctoate was added thereto dropwise over 3 hours with the dropping funnel, to which 0.5 parts of t-butyl peroctoate was added dropwise and kept at 115° C. for 1.5 hours to obtain a cation-modified acrylic resin having solid content of 65 wt %, number average molecular weight of 6,400, hydroxyl value of 87, and solubility parameter δa of 10.4.

To the cation-modified acrylic resin solution, 40 parts of the blocked polyisocyanate curing agent obtained in Production Example-2 was added and mixed for 30 minutes, to which 10 parts of ethyleneglycol n-monobutyl ether and 3 parts of acetic acid were added. Then ion-exchanged water was added thereto up to non-volatile content of 32 wt %, and condensed at a reduced pressure up to non-volatile content of 36 wt % to obtain aqueous emulsion particles containing cation-modified acrylic resin (hereinafter referred to E5)

Comparative Production Example 2 (Cation-Modified Acrylic Resin Emulsion (Resin Component A6))

A reaction vessel equipped with a stirrer, a condenser, a nitrogen-gas inlet, a thermometer and a dropping funnel was charged with 50 parts of methyl isobutyl ketone kept at 115° C. with heating under nitrogen atmosphere. A mixture of 18 parts of 2-hydroxyethyl methacrylate, 20.2 parts of methyl methacrylate, 30 parts of N,N-dimethylaminoethyl methacrylate, 0.8 parts of isobuthyl methacrylate, 31 parts of ethylacrylate and 4 parts of t-butyl peroctoate was added thereto dropwise over 3 hours with the dropping funnel, to which 0.5 parts of t-butyl peroctoate was added dropwise and kept at 115° C. for 1.5 hours to obtain a cation-modified acrylic resin having solid content of 65 wt %, number average molecular weight of 6,500, hydroxyl value of 87, and solubility parameter δa of 11.2.

To the cation-modified acrylic resin solution, 40 parts of the blocked polyisocyanate curing agent obtained in Production Example 2 was added and mixed for 30 minutes, and 10 parts of ethyleneglycol n-monobutyl ether and 3 parts of acetic acid were added and mixed for 30 minutes. Ion-exchanged water was added thereto up to non-volatile content of 32 wt %, and condensed at a reduced pressure up to non-volatile content of 36 wt % to obtain aqueous emulsion particles containing cation-modified acrylic resin (hereinafter referred to E6).

Production Example 8 (Production of Pigment Dispersing Resin)

A reaction vessel equipped with a stirrer, a condenser, a nitrogen-gas inlet and a thermometer was charged with 710 parts of bisphenol A type epoxy resin having an epoxy equivalent of 198 (available from Shell Chemical Co. as Epon 829) and 289.6 parts of bisphenol A, and reacted at a temperature of 150 to 160° C. for one hour under nitrogen atmosphere. After cooling to 120° C., 406.4 parts of a methyl isobutyl ketone solution containing tolylene diisocyanate half-blocked with 2-ethylhexanol (solid content of 95 wt %) was added to react. The reaction mixture was kept for one hour at a temperature of 110 to 120° C., to which 1584.1 parts of ethyleneglycol n-monobutyl ether was added, followed by cooling to 85 to 95° C., and mixing uniformly to obtain reacted material.

Separately, another reaction vessel was charged with 384 parts of a methyl isobutyl ketone solution containing tolylene diisocyanate half-blocked with 2-ethylhexanol (solid content of 95 wt %) and 104.6 parts of dimethylethanolamine, and mixed for one hour at 80° C. Then 141.1 parts of a 75% lactic acid solution and 47.0 parts of ethyleneglycol n-butyl ether were added thereto, and mixed for 30 minutes to obtain a quaternerizing agent having a solid content of 85 wt %. Thereafter, 620.5 parts of the quaternerizing agent was added to the above obtained reacted material and kept at a temperature of 85 to 95° C. to achieve acid value of 1, thus obtaining a resin solution of pigment dispersing resin having solid content of 56 wt %, a number average molecular weight of 2,200 and solubility parameter δp of 11.3.

Production Example 9 (Production of Pigment Dispersing Paste)

The following ingredients were dispersed in a sand mill to obtain a pigment dispersing paste (hereinafter referred to P1) containing the pigment dispersing resin obtained in Production Example 8.

TABLE 1

| Ingredients | Parts by weight |
|---|---|
| Pigment dispersing resin of Production Example 8 | 53.6 |
| Titanium dioxide | 88.0 |
| Carbon black | 2.0 |
| Aluminum phosphomolybdate | 10.0 |

Examples 1 to 4 and Comparative Example 1

The cation-modified resin emulsions (E-1 to E-5) obtained in Productive Example 3, 4, 5 and 7, the aqueous pigment dispersed pastes (P-1) obtained in Productive Example 9 and deionized water were used to prepare the aqueous coating compositions having a solid content of 20%. To the coating composition, an emulsion paste of dibutyltin oxide as curing accelerator was added so as to have a tin content of 1.5% based on a solid content of the coating composition. Formulations of each material, mixing ratios (a ratio of resin solid, calculated except for a weight of curing agent) and P/V ratio of pigment/resin vehicles (weights of total vehicles, containing a weight of curing agent) are shown in Table 2. Additionally, in Table 2, $\delta a$ represents the solubility parameter of the above resin component A, $\delta b$ represents the solubility parameter of the above resin component B, $\delta a'$ represents the solubility parameter of the above polyester resin, $\delta p$ represents the solubility parameter of the above pigment dispersing resin, $\delta i$ represents the solubility parameter of the above polyisocyanate.

are shown in Table 3. Each item of evaluation in table 3 is described below.

Observation of Gradient-Layer Structure of the Cured Gradient Coating Film

A cross-sectional area of the coating film was observed by Video Microscope. In the gradient coating film, a main resin component constituting each resin layer was identified using Fourier-transformed infrared attenuated total reflection (FTIR-ATR) spectrophotometer.

Determination of Concentration of the Pigment the concentration of the pigment in each layer was determined using scanning electron microscope (SEM-EDX). A relative pigment concentration of the titanium dioxide and aluminum phosphomolybdate in each layer was evaluated by visual observation of the distribution of titanium and aluminum atom.

Determination of Solvent Swelling Degree of Cured Gradient Coating Film

A solvent swelling degree were calculated based on the following formula:

Solvent swelling degree (%)=$\{(W1-W0)/W0\} \times 100$ wherein, W0 represents the weight of a cured gradient coating film before immersion into solvent, and W1 represents a weight of a cured gradient coating film after immersion into solvent at 20° C. for 5 days. Test samples had a size of 50 mm×50 mm, and a thickness of 20 μm. Methyl isobutyl ketone was used in the determination.

TABLE 2

| Example No. | Example 1 | Example 2 | Example 3 | Comparative Example 1 | Comparative Example 2 |
|---|---|---|---|---|---|
| Resin emulsion Aqueous pigment dispersed paste | E-1/E-2 | E-1/E-3 | E-1/E-4 | E-1/E-5 | E-1/E-6 |
| Mixing ratio of resins | 60/40 | 40/60 | 60/40 | 50/50 | 50/50 |
| $\delta a$ | 11.0 | 10.7 | 11.0 | 10.4 | 11.2 |
| $\delta b$ | 11.4 | 11.4 | 11.4 | 11.4 | 11.4 |
| $\delta b - \delta a$ | 0.4 | 0.7 | 0.4 | 1.0 | 0.2 |
| $\delta a'$ | — | — | 11.0 | — | — |
| The pigment dispersing resin | | | | | |
| $\delta p$ | 11.3 | 11.3 | 11.3 | 11.3 | 11.3 |
| $\delta b - \delta p$ | 0.1 | 0.1 | 0.1 | 0.1 | 0.1 |
| $\delta p - \delta a$ | 0.3 | 0.6 | 0.3 | 0.9 | 0.1 |
| $\delta i$ | 11.1 | 11.1 | 11.1 | 11.1 | 11.1 |
| P/V | 1/5 | 1/6 | 1/7 | 1/5 | 1/5 |

Electrodeposition coating was conducted using aqueous coating compositions according to the formulations of the above Examples and Comparative Examples on steel panels treated with zinc phosphate, at a voltage to achieve 20 μm thickness of the electrodeposition coating after baking, which was then baked for at 160° C. 15 minutes. The evaluation results to the obtained electrodeposition coatings

SDT

A coated filmcoating film of electrodeposition coating and was cut by a knife to reach the substrate and then salt water (5% salt water) was sprayed at 55° C. for 480 hours. An adhesive tape was put on a surface of the coating film and peeled off. Evaluation is shown as a maximum width (mm) of peeled area from the cut portion.

Adhesion of Crosscut

On a cured gradient coating film having 20 µm in thickness, an alkyd type top coating paint (Orgaselect silver, availabe from Nippon Paint Co.) was spray-coated to a dry thickness of 25 to 30 µm and baked at 140° C. for 20 minutes. One hundred Crosscuts having 2 mm×2 mm were formed, and an adhesive tape was adhered thereon. The tape was rapidly peeled off and number of crosscuts remaining on the coated surface was recorded.

Surface Roughness (Ra) of Coating Film of Electrodeposition Coating

Surface roughness (Ra) of a cured gradient coating film having 20 µm in thickness was determined with a cut-off 2.5 mm using Determination Device of Surface Roughness (SURFTEST 211, available from Mitsutoyo Co., Ltd.).

Evaluation of Appearance of the Multi-Layered Film

An organic solvent-type metallic base paint (SPM-170-1/199B silver, available from Nippon Paint Co.) and a clear paint (MAC-O-380, available from Nippon Paint Co.) were coated on a cured coating film having a thickness of 20 µm. Total appearance (surface smoothing) of obtained coating film was determined using "Wave scan-T" available from BYK-Gardner Co. The appearance was determined-by the W1, W2 and F values. The smaller the values of W1 and W2, the better the appearance. On the other hand, the larger the value of F, the better the appearance.

SWM

Samples in evaluation of appearance (two-layer multi-layered coating film) were set to Sunshine Whether Meter, and exposed for 4000 hours, followed by measuring 600 gross to determine retention in terms of default. The samples were then immersed in hot water (40° C.) for 10 days. One hundred crosscuts having 2 mm×2 mm were formed, and an adhesive tape was adhered thereon. The tape was rapidly peeled off and number of crosscuts remaining on the coated surface was recorded.

Dynamic Glass Transition Temperature

A tin plate was coated with electrodeposition coating and then cured to prepare samples for measurement. The coating film was frozen with liquid nitrogen, and a viscoelasticity was determined by raising temperature rate of 2° C. per a minute, and a vibrated at a frequency of 10 Hz, using Rheometrics Dynamic Analyzer RDA-II (available from Rheometrics Co.). A ratio (tan δ) of loss elasticity (E")/storage elasticity (E') was calculated and its inflexion point was determined to obtain each dynamic Tg (Tg(a), Tg(b) and Tg(c)). A dynamic Tg of intermediate coating layer was determined by: coating a tin plate with intermediate coating, curing it, removing off the coating film with mercury, and cutting to prepare samples for determination.

TABLE 3

| | Example No. | | | | |
|---|---|---|---|---|---|
| | Example 1 | Example 2 | Example 3 | Comparative example 1 | Comparative example 2 |
| Observation of electrodeposition film cross-sectional area concentration of pigment | separation of gradient layers | separation of gradient layers | separation of gradient layers | separation of complete two layers | uniform layer, no separation |
| titanium dioxide | a* < c < b | a* < c < b | a* < c < b | a* < b | — |
| aluminum phosphomolybdate | a* < c < b | a* < c < b | a* < c < b | a* < b | — |
| solvent swelling degree of the cured gradient coating film (%) | 12 | 20 | 15 | 40 | 15 |
| SDT | 0.1 mm | 0.1 mm | 0.1 mm | 0.2 mm | 4.0 mm |
| Adhesion of crosscut | 100/100 | 100/100 | 100/100 | 100/100 | 100/100 |
| Surface roughness (Ra) of the coating film of electrodeposition coating appearance of the multilayered film | 0.25 | 0.24 | 0.20 | 0.28 | 0.22 |
| W1/W2 value | 8/12 | 6/10 | 5/8 | 20/37 | 6/10 |
| F value | 4.8 | 4.8 | 4.9 | 4.0 | 4.8 |
| SWM | | | | | |
| gross retention (%) | 80 | 84 | 82 | 70 | 20 |
| weather-resistant and water-resistant peel test | 100/100 | 100/100 | 100/100 | 50/100 | 40/100 |
| Tg(a) of electrodeposition coating film | 60 | 70 | 60 | 50 | 90 |

TABLE 3-continued

|  | Example No. | | | | |
| --- | --- | --- | --- | --- | --- |
|  | Example 1 | Example 2 | Example 3 | Comparative example 1 | Comparative example 2 |
| Tg(b) | 130 | 120 | 130 | 135 | 90 |
| Tg(c) | 100 | 95 | 90 | — | — |

(Note)
Concentration of pigment was denoted by inequality sign on relative difference between concentrations of pigment in each layer. "a*" verges on integral number of 0, in this case, "a" layer is almost transparent.

The above Examples and Comparative Examples show that using the aqueous coating composition according to the present invention provides the forming of cured gradient coating film with excellent corrosion resistance, adhesiveness, surface smoothing. The multi-layered coating film obtained by directly applying the top coating composition on the electrodeposition coating film according to the process of the present invention clearly has excellent coating film appearance in spite of intermediate-coating-less system. Especially, in view of the comparison between Examples and Comparative Example 1 (the prior art type, separation of complete two layers), Comparative Example 2 (uniform layer, no separation), the gradient film layer has superior appearance (this appearance means the appearance of multi-layered coating film obtained by applying the top coating composition on the gradient film), and physical properties, which secures weather-resistance for a long period.

Example 7

The uncured electrodeposition gradient coating films having 20 μm in dry thickness obtained in Examples 1 and 4 were preheated at 110° C. for 10 minutes, and then coated with an organic solvent-type metallic base paint (SPM-170-1/199B silver, available from Nippon Paint Co.) and a clear paint (MAC-O-380, available from Nippon Paint Co.), and baked at 150° C. for 20 minutes to simultaneously bake and cure the uncured electrodeposition coating film and the uncured top coating film. Total appearance (determined using "Wave scan-T") of obtained coating film was excellent: W1=10, W2=15 and F=4.7 about Example 1; W1=8, W2=12 and F=4.7 about Example 4. In addition, the observation of cross-sectional area showed that each uncured electrodeposition gradient coating film after preheating at 110° C. for 10 minutes had gradient structure in spite of uncured.

As mentioned above, the process according to the present invention provides the formation of cured gradient coating film. When a substrate is conducted with the aqueous electrodeposition coating composition which contains the resin component A and the resin component B and the difference in solubility parameter between these resins is within the range of $0.2<(\delta b-\delta a)<1.0$, a cured gradient coating film that has the resin layer (a) in direct contact with air, the resin layer (b) in direct contact with the electrically conductive substrate, and a mixing resin layer (c) which is formed between the resin layer (a) and the resin layer (b) and is formed from the resin components each constituting resin layer (a) and (b) is formed, which has the gradient structure. The gradient coating film which is obtained according to the present invention has the structure which is composed of pseudo three layers across the depth.

Furthermore, when a cation-modified epoxy resin is used as the resin component constituting the resin layer (a) in direct contact with air before applying top coating, the cation-modified epoxy resin directs to an electrically conductive substrate based on the affinity for hydrophilic group such as hydroxyl group in the resin. This direction provides a cured gradient coating film having excellent weather-resistance and solvent resistance. In addition, when at least one cation-modified acrylic resin is used as the resin which is less-compatible with a cation-modified epoxy resin, a cured gradient coating film having excellent weather-resistance can be obtained.

Furthermore, using the blocked polyisocyanate as the curing agent, and adjusting the solubility parameter ($\delta i$) of the blocked polyisocyanate, the solubility parameter ($\delta a$) and the solubility parameter ($\delta b$) satisfying the relationship represented by the following formula: $\delta a \leq \delta i \leq \delta b$, provides improved dispersion of the curing agent in each resin layer. Thus a cured gradient coating film having resin layers cured equally can be obtained.

The forming process according to the present invention can control solvent swelling degree of the obtained cured coating film to not greater than 30%. Therefore, two-layer coating system in which a solvent-type top coating composition is directly applied on a cured gradient coating film can provide excellent coating film appearance equal to the conventional three-coat coating film.

The forming process according to the present invention can provide the cured gradient coating film containing the resin layer (a) in direct contact with air, the resin layer (b) in direct contact with the electrically conductive substrate, and a mixing resin layer (c) which is formed between the resin layer (a) and the resin layer (b) and is formed from the resin components each constituting resin layer (a) and (b). The structure of the cured gradient coating film can improve adhesiveness between the resin layer in direct contact with air and the resin layer in direct contact with the electrically conductive substrate, such as evaluated peel resistance on weathering. Therefore, the problem of peeling on weathering deterioration can be relieved in the weather-resistance test of two-layer coating system (intermediate-coating-less system). The use of the process according to the present invention in automobile coating can provide the automobile coating film with weather-resistance for a prolonged period.

The multi-layered coating film obtained by directly applying the top coating composition on the electrodeposition coating film according to the process of the present invention clearly has excellent coating film appearance, adhesiveness to a top coating layer, weather resistance and corrosion resistance in spite of intermediate-coating-less system. Accordingly, the method of the present invention plays an important roll in paint industry, especially in the field of automobile coating, for structuring a novel coating system which achieves step decrease of intermediate-coating-less, cost reduction and less damage to environment (VOC and HAPs).

What is claimed is:

1. A process for forming a cured gradient coating film, comprising the steps of:
    applying an aqueous electrodeposition coating composition comprising at least two resins and a curing agent, on an electrically conductive substrate by electrodeposition coating to form an electrodeposition film, wherein an electrically conductive substrate to be coated is immersed in an electrodeposition coating composition and an electric voltage is applied,
    heating the electrodeposition coating film to form a layer separation, and then
    curing the heated electrodeposition coating film to form a cured gradient coating film; wherein
    the resins include one resin component constituting a resin layer (a) in direct contact with air before applying top coating and the other resin component constituting a resin layer (b) in direct contact with the electrically conductive substrate, and
    a solubility parameter ($\delta a$) of a resin component constituting the resin layer (a) in direct contact with air and a solubility parameter ($\delta b$) of a resin component constituting the resin layer (b) in direct contact with the electrically conductive substrate have a relationship represented by the following formula:

$0.2 < (\delta b - \delta a) < 1.0$, and the gradient coating film comprises the resin layer (a) in direct contact with air, the resin layer (b) in direct contact with the electrically conductive substrate, and a mixing resin layer (c) which is formed between the resin layer (a) and the resin layer (b) and is formed from the resin components each constituting resin layer (a) and (b),
    wherein the resin component constituting the resin layer (a) contains a cation-modified acrylic resin, the resin component constituting the resin layer (b) contains a cation-modified epoxy resin and the curing agent is a blocked polyisocyanate,
    and solubility parameter ($\delta i$) of the blocked polyisocyanate, the solubility parameter of the resin component constituting the resin layer (a) and the solubility parameter of the resin component constituting the resin layer (b) have a relationship of $\delta a < \delta i < \delta b$.

2. The process for forming the cured gradient coating film according to claim 1, wherein a dynamic glass transition temperature Tg(a) of the resin layer (a) is within the range of 40 to 90° C., a dynamic glass transition temperature Tg(b) of the resin layer (b) is within the range of 100 to 150° C., and a dynamic glass transition temperature Tg(c) of the resin layer (c) is within the range of 70 to 120° C.

3. The process for forming the cured gradient coating film according to claim 1, wherein the one or more blocking agents is selected from the group consisting of oximes and lactams and are used in an amount of more than 60% by equivalent weight based on a total weight of the blocking agents used for blocking isocyanate.

4. The process for forming the cured gradient coating film according to claim 1, wherein the cured gradient coating film has a solvent swelling degree of not more than 30%.

5. A process for forming a multi-layered coating film, wherein a top coating composition is applied on the cured gradient coating film obtained according to any one of claims to 1, 2, 3 to 4, and baked.

6. The process for forming the multi-layered coating film according to claim 5, wherein the process comprising the steps of:
    preheating the electrodeposition coating film at a temperature lower than a temperature necessary for curing the electrodeposition coating film, before curing the electrodeposition coating film,
    applying the top coating composition on the electrodeposition coating film with wet-on-wet, and
    baking the electrodeposition coating film and top coating film simultaneously.

7. A process for forming a cured gradient coating film of claim 1 wherein the cation-modified acrylic resin is prepared either by ring opening addition of an acrylic polymer containing both plural oxirane rings and hydroxyl groups in one molecule with amines, or by polymerizing an amino group-containing acrylic monomer, an hydroxyl group-containing acrylic monomer and the other monomer and/or non-acrylic monomer.

* * * * *